United States Patent [19]

Zilch

[11] 4,433,002

[45] Feb. 21, 1984

[54] PROCESS FOR RAISIN PRODUCTION

[75] Inventor: Karl T. Zilch, Cincinnati, Ohio

[73] Assignee: Emery Industries, Inc., Cincinnati, Ohio

[21] Appl. No.: 287,398

[22] Filed: Jul. 27, 1981

Related U.S. Application Data

[63] Continuation-in-part of Ser. No. 133,942, Mar. 25, 1980, abandoned.

[51] Int. Cl.$^3$ ............................................. A23L 1/212
[52] U.S. Cl. ................................. 426/640; 426/442; 426/456
[58] Field of Search ............... 426/640, 102, 302, 442, 426/456, 465, 321

[56] References Cited

PUBLICATIONS

Grncarevic, *American Journal of Enology and Viticulture*, vol. 14, (1963), pp. 230–234.

Desrosier, Norman W.; *Elements of Food Technology*, AVI Publishing Co., Inc.; ©1977; p. 304, 'Raisins' by S. D. Poulsen.

Ponting, J. D. & McBean, D. M.; 'Temperature & Dipping Treatment Effects on Drying Rates and Drying Times of Grapes'; *Food Technology*, Dec. 1970, pp. 85–88.

Stafford, A. E. & Guadagni, D. G.; 'Storage Stability of Raisins Dried by Different Procedures'; *J. Food Science*, vol. 42, No. 2; 1977; pp. 547–548.

Rolin, H. R., Petrucci, V. & Fuller G.; 'Characteristics of Mechanically Harvested Raisins'; *J. Food Science*, vol. 40, No. 5; 1975; pp. 1036–1038.

Petrucci, V. & Canata, N.; 'Use of Oleic Acid Derivatives to Accelerate Drying of Thompson Seedless Grapes', *J. Oil Chem. Soc.*, vol. 51, No. 3, 1974, pp. 77–80.

Bolin, H. R. & Stafford, A. E.; 'Fatty Acid Esters and Carbonates in Grape Drying', *J. Food Science*, vol. 45, No. 3; 1980; pp. 754–755.

*Primary Examiner*—Raymond N. Jones
*Assistant Examiner*—Elizabeth J. Curtin
*Attorney, Agent, or Firm*—Kenneth D. Tremain; Gerald A. Baracka

[57] ABSTRACT

A process is provided whereby significantly improved drying rates are obtained in the production of raisins. The process involves treating the grapes with a hot aqueous solution containing a lower alkyl ester of a fatty acid and alkali metal carbonate prior to the drying operation.

7 Claims, No Drawings

PROCESS FOR RAISIN PRODUCTION

CROSS REFERENCE TO RELATED APPLICATION

This is a continuation-in-part of copending application Ser. No. 133,942, filed Mar. 25, 1980, now abandoned.

BACKGROUND OF THE INVENTION

The bulk of the raisins produced in the United States are still obtained from hand-picked grapes. Dehydration is accomplished by either "natural" sun drying or in gas-heated hot air tunnels. While the natural method is by far the most common method of making raisins it is not without disadvantages. Considerable hand labor is involved since the bunches of grapes must be turned after several days in order to obtain uniform drying and when drying is complete, the raisins must be transferred from the drying trays for further processing. Also, during drying there is always some loss due to birds, rodents, insects and, most importantly, weather. Since it generally requires several weeks for natural drying, i.e. to achieve a moisture content of about 15%, there is substantial risk of loss due to inclement weather. In 1978, for example, it has been estimated there was approximately 70% weather-related loss of the natural dried raisin crop.

In view of increasing labor costs and the other problems associated with the natural method, there has been renewed interest in forced air drying procedures and methods to accelerate dehydration using such processes. Treatment of the grapes with various materials to increase the drying rate is known. For example, grapes have been treated with hot caustic solutions (0.25% sodium hydroxide dissolved in water) prior to dehydration with hot air. While dipping in a hot caustic solution significantly increases the drying rate, there are certain problems associated with this procedure. The fine cracks which are formed in the skin as a result of such treatment, and which are believed to contribute to the rapid escape of water, often results in excessive stickiness. This is highly objectionable since sticky raisins are difficult to package and, when boxed, form a "lump" from which the individual raisins are not easily separated. Sticky raisins are also objectionable to the consumer.

To overcome the problems associated with such treatment, it has been suggested that hot caustic dip be replaced by a cold dip process. In the cold dip procedure the skins of the grapes are not cracked or checked and the resulting raisins are less sticky and have a more desirable and uniform color. Typically the operation involves immersing the grapes for 3 to 5 minutes in an aqueous dipping solution maintained at ambient temperature and containing about 2.5% alkali metal carbonate, about 2% fatty acid or fatty ester and an emulsifying agent.

General reference to the use of "alkaline" fatty acid ester dipping solutions (hot or cold) to accelerate drying is made at page 307 of *Elements of Food Technology,* Norman W. Desrosier (Ed.), AVI Publishing Company, Inc. (1977). There is no mention, however, to the conditions or the specific formulations. There is no suggestion in the reference to the utilization of potassium carbonate with fatty acid esters and one skilled in the art would have no reason to expect, based on the reference teachings, that significantly improved results could be obtained therewith.

SUMMARY OF THE INVENTION

It has now quite unexpectedly been discovered that by treating grapes with hot aqueous solutions containing potassium carbonate and a $C_{8-22}$ fatty acid ester that the drying rate is significantly increased. It is even more surprising that the raisins obtained by this process are not excessively sticky and have a highly desirable rich color. The present process involves contacting the grapes, individually or in bunches, with the aqueous solution at a temperature from 60°–98° C. for a relatively short period of time prior to the drying operation.

The amount of fatty acid ester in the treating solution can range from about 0.5 to 5 wt. % but most usually will be between 0.75 and 3 percent by weight. Lower alkyl esters of fatty acids having from 8 to 22 carbon atoms can be used, however, methyl or ethyl esters of $C_{12-18}$ fatty acids or mixtures of fatty acids, such as are typically obtained from natural fats and oils, are particularly advantageous. The treating solution also contains 0.5 to 4 wt. percent potassium carbonate. Emulsifying agents may also be present with the ester and alkali metal carbonate. Grapes treated in accordance with the present improved procedure can be dried either naturally, i.e. sun dried, or by exposure to hot air.

DETAILED DESCRIPTION

The method of this invention comprises disposing freshly picked grapes in a hot aqueous solution containing an effective amount of a lower alkyl ester of a fatty acid and potassium carbonate. Useful esters for the process are obtained by any of the conventional esterification procedures known to the art. $C_{1-4}$ alkyl esters of fatty acids, or mixed fatty acids, having 8 to 22 carbon atoms are employed. The fatty acids can be branched or straight-chain and will be saturated or contain unsaturation. They can be obtained from natural fats or oils or synthetically produced via oxo, Koch or other known reactions. Similarly, the ester portion of the molecule can be branched or straight-chain. Illustrative fatty acid esters useful for the treatment of grapes in accordance with the method of this invention are the methyl, ethyl, propyl and butyl esters of caproic acid, caprylic acid, capric acid, lauric acid, myristic acid, palmitic acid, stearic acid, isostearic acid, ricinoleic acid, oleic acid, linoleic acid, behenic acid, erucic acid and mixed acids derived from coconut oil, lard oil, tall oil, safflower oil, corn oil, tallow, soyabean oil, palm oil, castor oil, rapeseed oil and the like. Methyl and ethyl esters of $C_{12-18}$ fatty acids or mixtures of fatty acids are particularly advantageous for the process.

While esters of fatty acids are preferably employed, improvement in the rate of dehydration is also realized using the free, i.e. unesterified, fatty acid. It is possible to employ a mixture of ester and free fatty acid and in some instances the use of such mixtures may be advantageous. It is not necessary that the ester be derived from the same fatty acid. Useful mixtures of this type can be obtained by only partially esterifying a fatty acid or fatty acid mixture so that the resulting product has a residual acid value, usually less than 20. If free fatty acids are present, they will generally not exceed about 10% by weight of the acid/ester mixture.

The amount of fatty acid ester employed will range between about 0.5 and 5 percent by weight of the solution, however, superior results are obtained using solutions containing between about 0.75 and 3 wt. % fatty acid ester. From about 0.5 to 4 wt. percent potassium carbonate is present with the fatty acid ester in the treating solution. It is especially advantageous for the process of this invention to employ from 1 to 3 percent by weight potassium carbonate in the solution.

The length of time required for the grapes to be in contact with the aqueous treating solution can be widely varied and will depend on the type and condition of the grapes being processed and the temperature and concentration of the aqueous treating solution. The temperature of the solution for the present process can range from 60° C. and 98° C., however, treatment temperatures from 80° C. to 98° C. are especially useful. When operating within the above-defined temperature and concentration ranges, treatment times generally will not exceed about two minutes. Significantly longer times may be detrimental to raisin quality and there is little advantage to be gained from the standpoint of the length of time required to dehydrate the grapes. When the grapes are treated by dipping, dip times will generally range from 10 seconds to about 1½ minutes, particularly if the solution is maintained in the preferred temperature range of 80° C. to 98° C.

The particular method in which the grapes are contacted with the fatty acid ester will vary. The grapes can be lowered into a bath containing the heated solution in trays or baskets or they may be continuously passed through a tank containing the aqueous treating solution. Under properly controlled conditions, the hot aqueous solution can also be applied to the grapes by spraying. To a large extent, the method of treatment is determined by the equipment available and whether the grapes are on or off the bunch. No appreciable difference is observed with the present process when the individual berries have been removed from the bunch and treated as such or when they are allowed to remain on the bunch. Also, the type of equipment and method of application will determine the particular formulation used. For example, if there is provision for efficient agitation of the treating solution use of external emulsifying agents may not be necessary, however, if there is no such provision emulsifiers may be advantageously employed. It may also be advantageous to utilize multiple treatment steps, that is, where the grapes are contacted with solution of the fatty acid ester and potassium carbonate in two or more treatment operations. In such situations the concentration of the treating solution(s) and/or time/temperature of treatment can be different for each of the various treatments. Also, the length of time between the contacting operations can be varied to achieve beneficial results.

After treatment with the hot aqueous solution the grapes are dried to the desired moisture content. Any known and commonly used dehydration procedure can be utilized for this purpose. For example, the grapes may be placed in trays and allowed to dry in the sun or dehydrated by exposure to hot air. Typically, hot air drying is accomplished in a tunnel or chamber where the warm air is passed over the grapes at a rapid rate. The air temperature and the velocity can be varied within accepted practice, however, drying temperatures will generally not exceed about 70° C. Drying is continued until the desired moisture content is achieved—typically less than 20% and more usually about 15%, depending on the end use of the raisin and whether it is to be further treated with preservatives, humectants, softening agents, or the like. Raisins treated in accordance with the present process can be further processed in accordance with any of the accepted procedures presently used to impart the overall desired characteristics to the final product. This, of course, will vary depending on whether the raisins are to be packaged for consumption as such or whether they are to be used in cereal or other food products. Where "golden" raisins are desired, the grapes after treatment can be bleached by exposure to sulfur dioxide.

While the process of this invention is most usually employed for the production of raisins from Thompson seedless grapes, it is also adaptable for use with other grape varieties. Cherries and other fruits may also be beneficially treated in accordance with the present process to facilitate drying.

The following examples illustrate the process of the invention more fully. In these examples all parts and percentages are on a weight basis unless otherwise indicated.

EXAMPLE I

To demonstrate the process of this invention an aqueous dispersion containing 2% methyl laurate (acid value 0.3; titer 2.2° C.; derived from commercial grade acid—97% lauric/3% myristic), 2% potassium carbonate and 0.075% glycerol monooleate was prepared. The solution was heated to 95° C. and Thompson seedless grapes, from which any loose or damaged berries had been removed, immersed therein for one minute. The bunches of grapes were then removed, allowed to drain and dried in a forced-air oven maintained at 65° C. until the fruit contained about 17 percent moisture. Under these laboratory conditions it required about 20 hours to obtain the desired moisture level, however, more rapid dehydration can be achieved in commercial drying equipment. The resulting raisins had a rich color and did not exhibit excessive oiliness or surface stickiness.

To further demonstrate the superiority of the present hot dip treatment, the rate of dehydration was determined for grapes treated with the above solution at 95° C. and compared with the rate obtained for grapes dipped in the same solution maintained at ambient temperature (24° C.). In both instances drying was accomplished in a 65° C. forced-air oven. Relative rate constants ($K_a$) were determined based on a water (24° C.) control which was arbitrarily assigned a rate constant of 1.0 and assuming a first order process i.e., the rate is a function of water removed during the first stage of drying, in accordance with the formula $$K_a = \frac{\text{Log } A_o - \text{Log } A}{\text{Log } W_o - \text{Log } W} (K_w)$$

where $A_o$ = initial percent water
$A$ = percent water at weighing
$W_o$ = initial percent water of control
$W$ = wt. percent water of control at weighing
$K_w$ = rate constant for water (1.0)

Weight percents were obtained by determining the weight of the fruit initially, after 5½ hours and after total dehydration. The relative rate obtained for grapes which were hot-dipped in the methyl ester solution was 3.76 whereas, when the room temperature dip was employed, a relative rate of only 2.58 was obtained. Similar marked improvement in the drying rate is observed if the grapes are allowed to dry in the sun and there is no appreciable change in the drying rate if the ethyl ester is substituted for the methyl ester in the above formulation.

EXAMPLE II

In a manner similar to that described in Example I, grapes on the bunch were dipped in an aqueous dispersion containing 2% methyl ester of tallow fatty acids (acid value 0.4; titer 13.3° C.), 2% potassium carbonate and 0.075 weight percent glycerol monooleate. The tallow fatty acid mixture was comprised of 3% myristic acid, 28% palmitic acid, 25% stearic acid, 42% oleic acid and 3% linoleic acid. The grapes were dipped (1 minute) in solutions maintained at 40° C. and 95° C. and then dried at 65° C. The relative drying rates obtained were 2.03 and 3.57, respectively. From the above data it is evident that the rate of dehydration obtained by dipping at 95° C. is significantly better than that obtained with the 40° treatment. Also, there is no appreciable difference in the quality of the raisins produced by dipping at the higher temperature. Whereas reduction of drying time (compared to a water control) is obtained when the potassium carbonate and glycerol monooleate are omitted from the aqueous treating solution, it is necessary to employ a dispersator (high shear agitator) to maintain a dispersion and the relative rates obtained are significantly less than obtained by the process of this invention.

EXAMPLE III

To demonstrate the versatility of this invention an aqueous dispersion was prepared from a fatty acid mixture (5% myristic acid, 25% stearic acid, 60% oleic acid and 15% linoleic acid) which was 98% esterified. Two percent of the product (acid value 3.6, titer 16.2°) was combined with 2% potassium carbonate and 0.075% glycerol monooleate in water with agitation and the resulting dispersion used for treatment of Thompson seedless grapes. The grapes were immersed for 1 minute in the dispersion which was maintained at 95° C. and then dried in a 65° oven. The relative drying rate was 3.86 whereas the control (grapes dipped at room temperature and dried under identical conditions) gave a relative rate of drying of only 1.86. An acceptable dispersion and comparable rate enhancement is obtained when the external emulsifying acid (glycerol monooleate) is omitted from the treating solution.

To further point out the superior results obtained with the present process and the need for the methyl esters, grapes were dipped in boiling tap water for 1 minute and dried at 65° C. A relative drying rate of only about 2 is obtained in the absence of methyl ester and potassium carbonate.

EXAMPLE IV

A series of experiments were conducted using aqueous dispersions prepared using methyl esters of different fatty acids and mixed fatty acids. Fatty acids employed for the formation of the esters were oleic acid, lauric acid and mixed fatty acids derived from palm oil, lard oil, soybean oil and tallow. For the preparation of the aqueous dipping solution 2% of the methyl ester was dispersed with 2% potassium carbonate and 0.075% emulsifier. These solutions were then used to hot dip (95° C.) Thompson seedless grapes. For these tests the grapes were removed from the bunch and placed in metal containers for immersion into the hot solutions. After 1 minute the grapes were removed and dehydrated at 65° C. The relative drying rates obtained with each of the various solutions, determined after 4 hours, are set forth below and compared with a control wherein the grapes were immersed for 1 minute in 95° water containing no methyl ester, potassium carbonate or emulsifier.

|  | Relative Drying Rate |
|---|---|
| Control | 1.4 |
| Methyl Oleate | 3.1 |
| Methyl Laurate | 3.4 |
| Methyl Ester of Palm Oil Fatty Acids | 3.2 |
| Methyl Ester of Lard Oil Fatty Acids | 3.0 |
| Methyl Ester of Soybean Oil Fatty Acids | 2.9 |
| Methyl Ester of Tallow Fatty Acids | 3.0 |

It is evident from the above data that a significant increase in the drying rate is achieved with the grapes dipped in the solutions containing the methyl esters. Furthermore, the raisins obtained by such treatment have a rich color and are not sticky.

The improved surface qualities of raisins obtained by this process versus that obtained with raisins produced using heretofore known hot dip procedures, i.e. grapes are dipped in hot caustic, were demonstrated as follows: The raisins obtained above by treatment with the methyl ester/potassium carbonate were placed in glass containers to a specified height and covered with a weighted glass plate for 1 minute. The glass plate and weight were then removed and the container slowly inverted. Raisins obtained by the process of this invention did not stick to the glass and did not stick to each other. The raisins fell freely from the container. On the other hand, raisins which were treated with 95° C. aqueous caustic solution (0.25% sodium hydroxide) and dried in an identical manner to the same moisture content, stuck firmly to each other and to the glass and did not fall when the container was inverted.

EXAMPLE V

To demonstrate the criticality of the components used in the preparation of the dipping solutions employed for the process of this invention, Thompson seedless grapes were dipped for 1 minute in (a) an aqueous dipping solution containing 2% potassium carbonate, 1.93% methyl oleate and 0.075% glycerol monooleate; (b) an aqueous dipping solution containing 2% potassium carbonate; and (c) an aqueous dipping solution containing 1.93% methyl oleate and 0.075% glycerol monooleate. For comparative purposes and to demonstrate the inability to obtain acceptable results using other alkaline fatty acid ester dipping solutions, (a) was reformulated using an equivalent amount (on a molar basis) of potassium hydroxide in place of the potassium carbonate and the resulting aqueous formulation identified as (d).

Grapes were dipped in each of the above solutions maintained at 95°–98° C., dehydrated in a forced draft oven at 65° C., and the relative rates of dehydration obtained during the first eight hours of drying determined. Rate calculations for this experiment were based on a hot (95° C.) water control. Relative rates were as follows:

|  | RATE |
|---|---|
| Dipping Solution (a) | 2.76 |
| Dipping Solution (b) | 1.85 |

| | RATE |
|---|---|
| Dipping Solution (c) | 2.07 |
| Dipping Solution (d) | 2.24 |

In addition to the fact that an improvement in the drying rate is observed with the product (a), raisins obtained from grapes treated with the other dipping solutions were also judged to be inferior to those obtained in accordance with the process of this invention. To demonstrate this point, grapes treated with each of the above dipping solutions (a)–(d) were dried at 65° C. until 70–80% weight loss was achieved. The moisture level was then reduced to approximately 15% by drying under ambient conditions and, after the raisins were allowed to equilibrate at this moisture level for several days, the physical appearance of the raisins determined. Whereas raisins obtained from grapes treated with (a) were firm, had a uniform dark golden-brown color and were not objectionably oily or sticky, the raisins obtained using (d) were sticky, soft and pasty feeling, and were mottled (black at one end and tan around the cuticle). The latter raisins also had a sharp burnt odor. Raisins obtained by dipping in hot potassium carbonate alone (solution (b)) were somewhat sticky and had uneven glossy areas between the wrinkle ridges. The raisins obtained using the hot methyl ester/emulsifier solution (c) were slightly oily and had a glossy appearance.

The above results demonstrate that, at the high temperatures employed for the dipping process, it is only possibly to obtain optimum dehydration rates and raisins of acceptable quality when potassium carbonate and a lower alkyl fatty acid ester are employed in combination.

I claim:

1. A method for increasing the drying rate of grapes for the production of raisins which comprises contacting the grapes for an effective period of time, but one which is insufficient to be detrimental to the raisin quality, with an aqueous solution maintained at a temperature from 60° C. to 98° C. containing 0.5 to 4 weight percent potassium carbonate and 0.5 to 5 weight percent of a lower alkyl ester of a $C_{8-22}$ fatty acid, said ester containing free fatty acid in an amount up to 10 percent by weight, and thereafter drying the grapes to the desired moisture content.

2. The method of claim 1 wherein an amount up to about 1 weight % anionic or nonionic emulsifier derived from fatty acid is present in the aqueous solution.

3. The method of claim 2 wherein the lower alkyl fatty ester is a methyl or ethyl ester of $C_{12-18}$ fatty acid or mixture of fatty acids.

4. The method of claim 3 wherein the lower alkyl fatty ester is present in an amount of 0.75 to 3 weight percent and the potassium carbonate is present in an amount from 1 to 3 weight percent.

5. The method of claim 4 wherein the temperature of the aqueous solution is from 80° C. to 98° C.

6. The method of claim 5 wherein the grapes are contacted with the aqueous solution for a period of from 10 seconds to 1½ minutes and dried to a moisture content of less than 20%.

7. The method of claim 6 wherein the drying is accomplished in a forced-air oven.

* * * * *